United States Patent
Traynor et al.

(10) Patent No.: US 9,222,044 B2
(45) Date of Patent: Dec. 29, 2015

(54) METHODS FOR PRODUCING LOW OXYGEN BIOMASS-DERIVED PYROLYSIS OILS

(75) Inventors: Thomas Traynor, Buffalo Grove, IL (US); Timothy A. Brandvold, Arlington Heights, IL (US)

(73) Assignee: UOP LLC, Des Plaines, IL (US)

( * ) Notice: Subject to any disclaimer, the term of this patent is extended or adjusted under 35 U.S.C. 154(b) by 513 days.

(21) Appl. No.: 12/843,649

(22) Filed: Jul. 26, 2010

(65) Prior Publication Data

US 2012/0017493 A1 Jan. 26, 2012

(51) Int. Cl.
- *C10L 1/10* (2006.01)
- *C10L 1/18* (2006.01)
- *C10L 1/02* (2006.01)

(52) U.S. Cl.
CPC .................................. *C10L 1/02* (2013.01)

(58) Field of Classification Search
CPC ............... C10L 1/02; C10L 1/09; C10L 1/10
USPC ..................... 585/240; 44/313, 388
See application file for complete search history.

(56) References Cited

U.S. PATENT DOCUMENTS

| | | | |
|---|---|---|---|
| 4,695,411 A | 9/1987 | Stern et al. | |
| 4,698,186 A | 10/1987 | Jeromin et al. | |
| 5,372,705 A | 12/1994 | Bhattacharya et al. | |
| 5,525,126 A | 6/1996 | Basu et al. | |
| 5,871,635 A | 2/1999 | Gupta et al. | |
| 6,881,760 B1 | 4/2005 | Smith et al. | |
| 6,919,017 B2 | 7/2005 | Annesley et al. | |
| 6,956,125 B2 | 10/2005 | Wollmann et al. | |
| 7,476,295 B2 | 1/2009 | Annesley et al. | |
| 7,615,142 B2 | 11/2009 | Lee et al. | |
| 7,655,135 B2 | 2/2010 | Havlik et al. | |
| 2004/0231236 A1 | 11/2004 | May | |
| 2005/0004239 A1 | 1/2005 | Bull et al. | |
| 2006/0011518 A1 | 1/2006 | Feimer | |

(Continued)

FOREIGN PATENT DOCUMENTS

| | | |
|---|---|---|
| EP | 1448750 B1 | 6/2008 |
| WO | 2007087838 A1 | 8/2007 |
| WO | 2008013551 A1 | 1/2008 |
| WO | 2010025326 A1 | 3/2010 |

OTHER PUBLICATIONS

Boorman, P.M., et al., Preparation of carbon-covered alumina using fluorohydrocarbons: A new acidic support material, Applied Catalysis A: General, v 95, n 2, p. 197-210, Mar. 3, 1993.

(Continued)

*Primary Examiner* — James Goloboy
*Assistant Examiner* — Latosha Hines

(57) ABSTRACT

Methods for producing low oxygen biomass-derived pyrolysis oil are provided. Starting biomass-derived pyrolysis oil is deoxygenated by exposing the biomass-derived oil to a first catalyst in the presence of hydrogen-containing gas at first hydroprocessing conditions to produce a partially deoxygenated biomass-derived pyrolysis oil. The first catalyst has a neutral catalyst support. The partially deoxygenated biomass-derived pyrolysis oil is exposed to a second catalyst in the presence of additional hydrogen-containing gas at second hydroprocessing conditions to produce a hydrocarbon product. The biomass-derived pyrolysis oil may be esterified prior to deoxygenation. A portion of the low oxygen biomass-derived pyrolysis oil is recycled.

16 Claims, 5 Drawing Sheets

(56) References Cited

U.S. PATENT DOCUMENTS

| | | | |
|---|---|---|---|
| 2007/0123416 | A1 | 5/2007 | Mayoral et al. |
| 2008/0050792 | A1 | 2/2008 | Zmierczak et al. |
| 2008/0097114 | A1 | 4/2008 | Bakshi |
| 2009/0030219 | A1 | 1/2009 | Su |
| 2009/0088351 | A1* | 4/2009 | Miller ............... 508/216 |
| 2009/0139137 | A1 | 6/2009 | Ikura et al. |
| 2009/0188158 | A1* | 7/2009 | Morgan ............... 44/308 |
| 2009/0199463 | A1 | 8/2009 | May et al. |
| 2009/0253948 | A1* | 10/2009 | McCall et al. ......... 585/240 |
| 2009/0301930 | A1* | 12/2009 | Brandvold et al. ......... 208/17 |
| 2010/0058652 | A1 | 3/2010 | Farwick et al. |
| 2010/0170147 | A1 | 7/2010 | McNeff et al. |
| 2011/0146145 | A1* | 6/2011 | Brandvold et al. ......... 44/457 |
| 2011/0201855 | A1* | 8/2011 | Marinangeli et al. ......... 585/240 |
| 2011/0232166 | A1* | 9/2011 | Kocal ............... 44/313 |

OTHER PUBLICATIONS

Fujita, K., et al., New developments in resid hydroprocessing, Petroleum Technology Quarterly, v 6, n 4, p. 51-52, 54, 56, 58, Winter 2001/2002.

Sabin Metal Corporation, Catalyst review: Saint Gobain NorPro, Hydrocarbon Engineering, v 15, n 1, p. 55-56, Jan. 2010.

Xu, Y, et al., Upgrading of liquid fuel from the vacuum pryolysis of biomass over the Mo-Mi/y-AI203 catalysis, Biomass and Bioenergy, 33 (8) 2009.

Tang, Z., et al., One step bio-oil upgrading through hydrotreatment, esterification, and cracking, Industrial and Engineering Chemistry Research 48(15) 2009 p. 6923-6929.

Xu, Y., et al., Hydrotreatment of vacuum pyrolysis bio-oil on nickel catalyst, Taiyangneng Xuebao/Acta Energiae Solaris Sinica, v 30, n 2, p. 245-248, Feb. 2009.

Peng, J., et al., Upgrading of bio-oil over aluminum silicate in supercritical ethanol, Energy and Fuels, American Chemical Society, 22(5) 2008 p. 3489-3492.

Fisk, C.A., et al., Bio-oil upgrading over platinum catalysts using in situ generated hydrogen, Applied Catalysis A: General 358(2) 2009 Elsevier, p. 150-156.

Junming, W., et al., Biooil upgrading by means by ethyl ester production in reactive distillation to remove water and to improve storage and fuel characteristics, Biomass and Bioenergy, 31(11) p. 1056-1061, 2008.

* cited by examiner

| COMBINATION (%) | Ni | Co | Mo | W | Rd | Rh | Au | Pd |
|---|---|---|---|---|---|---|---|---|
| Ni Mo | 0.5-3-5 | | 5-15-20 | | | | | |
| Co Mo | | 0.5-3-5 | 5-15-20 | | | | | |
| Ni Co Mo | 0.1-1-5 | 0.5-3-5 | 5-15-20 | | | | | |
| Ni W | 0.5-3-5 | | | 5-15-20 | | | | |
| Co W | | 0.5-3-5 | | 5-15-20 | | | | |
| Ni Co W | 0.1-1-5 | 0.5-3-5 | | 5-15-20 | | | | |
| Rd | | | | | 0.1-0.5-5 | | | |
| Rh | | | | | | 0.1-1-5 | | |
| Au | | | | | | | 0.1-1-5 | |
| Pd | | | | | | | | 0.1-1-5 |

FIG. 4

| COMBINATION (%) | SUPPORT A | SUPPORT B | SUPPORT C | SUPPORT D |
|---|---|---|---|---|
| Ni Mo | $TiO_2$ | $ZrO_2$ | THETA ALUMINA | $Nb_2O_5$ |
| Co Mo | $TiO_2$ | $ZrO_2$ | THETA ALUMINA | $Nb_2O_5$ |
| Ni Co Mo | $TiO_2$ | $ZrO_2$ | THETA ALUMINA | $Nb_2O_5$ |
| Ni W | $TiO_2$ | $ZrO_2$ | THETA ALUMINA | $Nb_2O_5$ |
| Co W | $TiO_2$ | $ZrO_2$ | THETA ALUMINA | $Nb_2O_5$ |
| Ni Co W | $TiO_2$ | $ZrO_2$ | THETA ALUMINA | $Nb_2O_5$ |
| Rd | $TiO_2$ | $ZrO_2$ | THETA ALUMINA | $Nb_2O_5$ |
| Rh | $TiO_2$ | $ZrO_2$ | THETA ALUMINA | $Nb_2O_5$ |
| Au | $TiO_2$ | $ZrO_2$ | THETA ALUMINA | $Nb_2O_5$ |
| Pd | $TiO_2$ | $ZrO_2$ | THETA ALUMINA | $Nb_2O_5$ |

FIG. 5

METHODS FOR PRODUCING LOW OXYGEN BIOMASS-DERIVED PYROLYSIS OILS

FIELD OF THE INVENTION

The present invention generally relates to methods for producing biofuels, and more particularly relates to methods for producing low oxygen biomass-derived pyrolysis oils.

DESCRIPTION OF RELATED ART

Fast pyrolysis is a process during which organic carbonaceous biomass feedstock, i.e., "biomass", such as wood waste, agricultural waste, etc., is rapidly heated to between about 300° C. to about 900° C. in the absence of air using a pyrolysis reactor. Under these conditions, solid products, liquid products, and gaseous pyrolysis products are produced. A condensable portion (vapors) of the gaseous pyrolysis products is condensed into biomass-derived pyrolysis oil. Biomass-derived pyrolysis oil can be burned directly as fuel for certain boiler and furnace applications, and can also serve as a potential feedstock in catalytic processes for the production of fuels in petroleum refineries. Biomass-derived pyrolysis oil has the potential to replace up to 60% of transportation fuels, thereby reducing the dependency on conventional petroleum and reducing its environmental impact.

However, biomass-derived pyrolysis oil is a complex, highly oxygenated organic liquid having properties that currently limit its utilization as a biofuel. For example, biomass-derived pyrolysis oil has high acidity and a low energy density attributable in large part to oxygenated hydrocarbons in the oil, which undergo secondary reactions during storage. "Oxygenated hydrocarbons" as used herein are organic compounds containing hydrogen, carbon, and oxygen. Such oxygenated hydrocarbons in the biomass-derived pyrolysis oil include carboxylic acids, phenols, cresols, aldehydes, etc. Conventional biomass-derived pyrolysis oil comprises about 30% by weight oxygen from these oxygenated hydrocarbons. Conversion of biomass-derived pyrolysis oil into biofuels and chemicals requires full or partial deoxygenation of the biomass-derived pyrolysis oil. Such deoxygenation may proceed via two main routes, namely the elimination of either water or $CO_2$. Unfortunately, deoxygenating biomass-derived pyrolysis oil leads to rapid plugging or fouling in a hydroprocessing reactor caused by the formation of solids from the biomass-derived pyrolysis oil. Particulates in the oil settle on the processing catalysts causing catalytic bed fouling reducing activity of the catalyst and causing build up in the hydroprocessing reactor. It is believed that this plugging is due to an acid catalyzed polymerization of the biomass-derived pyrolysis oil that creates either a glassy brown polymer or powdery brown char, which limit run duration and processibility of the biomass-derived pyrolysis oil.

Accordingly, it is desirable to provide methods for producing low oxygen biomass-derived pyrolysis oils. In addition, it is also desirable to produce low oxygen biomass-derived pyrolysis oils without plugging of the reactor thereby increasing run duration and improving processibility of biomass-derived pyrolysis oil. Furthermore, other desirable features and characteristics of the present invention will become apparent from the subsequent detailed description of the invention and the appended claims, taken in conjunction with the accompanying drawings and this background of the invention.

SUMMARY OF THE INVENTION

Methods are provided for producing low oxygen biomass-derived pyrolysis oil from treated biomass-derived pyrolysis oil. In accordance with one exemplary embodiment, the method comprises esterifying the treated biomass-derived pyrolysis oil and deoxygenating the esterified biomass-derived pyrolysis oil.

Methods are provided for producing low oxygen biomass-derived pyrolysis oil, in accordance with yet another exemplary embodiment of the present invention. The method comprises exposing treated biomass-derived pyrolysis oil to a first catalyst having a neutral catalyst support in the presence of hydrogen-containing gas at first hydroprocessing conditions comprising a reaction temperature in the range of about 100° C. to about 400° C., a pressure of about 3204 kPa to about 12410 kPa (450 to about 1800 psig), a liquid hourly space velocity of about 0.25 volume of liquid feed/volume of catalyst/hour (V/V/Hr) to about 1.0 V/V/Hr, and a hydrogen-containing gas treat rate of about 1000 SCF/B to about 12000 SCF/B.

Methods are provided for producing low oxygen biomass-derived pyrolysis oil, in accordance with yet another exemplary embodiment of the present invention. The method comprises reacting esterified biomass-derived pyrolysis oil at first hydroprocessing conditions in the presence of hydrogen-containing gas and a first catalyst to produce a partially deoxygenated hydrocarbon oil and water. The water is separated from the partially deoxygenated biomass-derived pyrolysis oil. The partially deoxygenated hydrocarbon oil is reacted at second hydroprocessing conditions in the presence of additional hydrogen-containing gas and a second catalyst to convert residual oxygenated hydrocarbons therein into hydrocarbons. A portion of the low oxygen biomass-derived pyrolysis oil is recycled to dilute the esterified biomass-derived pyrolysis oil.

BRIEF DESCRIPTION OF THE DRAWINGS

The present invention will hereinafter be described in conjunction with the following drawing figures, wherein like numerals denote like elements, and wherein:

FIG. 4 is a table of suitable exemplary metals of exemplary catalysts having a neutral catalyst support for producing low oxygen biomass-derived pyrolysis oils; and FIG. 5 is a table of exemplary neutral catalyst supports for the metals of FIG. 4;

DETAILED DESCRIPTION

The following detailed description of the invention is merely exemplary in nature and is not intended to limit the invention or the application and uses of the invention. Furthermore, there is no intention to be bound by any theory presented in the preceding background of the invention or the following detailed description of the invention.

Various exemplary embodiments of the present invention are directed to methods for producing low oxygen biomass-derived pyrolysis oils by deoxygenating treated and/or esterified biomass-derived pyrolysis oil. It should be appreciated that while the low oxygen biomass-derived pyrolysis oil produced according to exemplary embodiments of the present invention is generally described herein as a "low oxygen biomass-derived pyrolysis oil", this term generally includes any oil produced having a lower oxygen concentration than conventional biomass-derived pyrolysis oil. The term "low oxygen biomass-derived pyrolysis oil" includes partially deoxygenated biomass-derived pyrolysis oil containing residual oxygenated hydrocarbons and biomass-derived pyrolysis oil that has no oxygen i.e., a hydrocarbon product in which all the oxygenated hydrocarbons have been converted into hydrocarbons. "Hydrocarbons" as used herein are organic compounds that contain principally only hydrogen and carbon, i.e., they are oxygen-free. As noted previously, "oxygenated hydrocarbons" as used herein are organic compounds containing hydrogen, carbon, and oxygen and exemplary oxygenated hydrocarbons in biomass-derived pyrolysis oil include alcohols such as phenols and cresols, carboxylic acids, aldehydes, etc.

Figure 1:
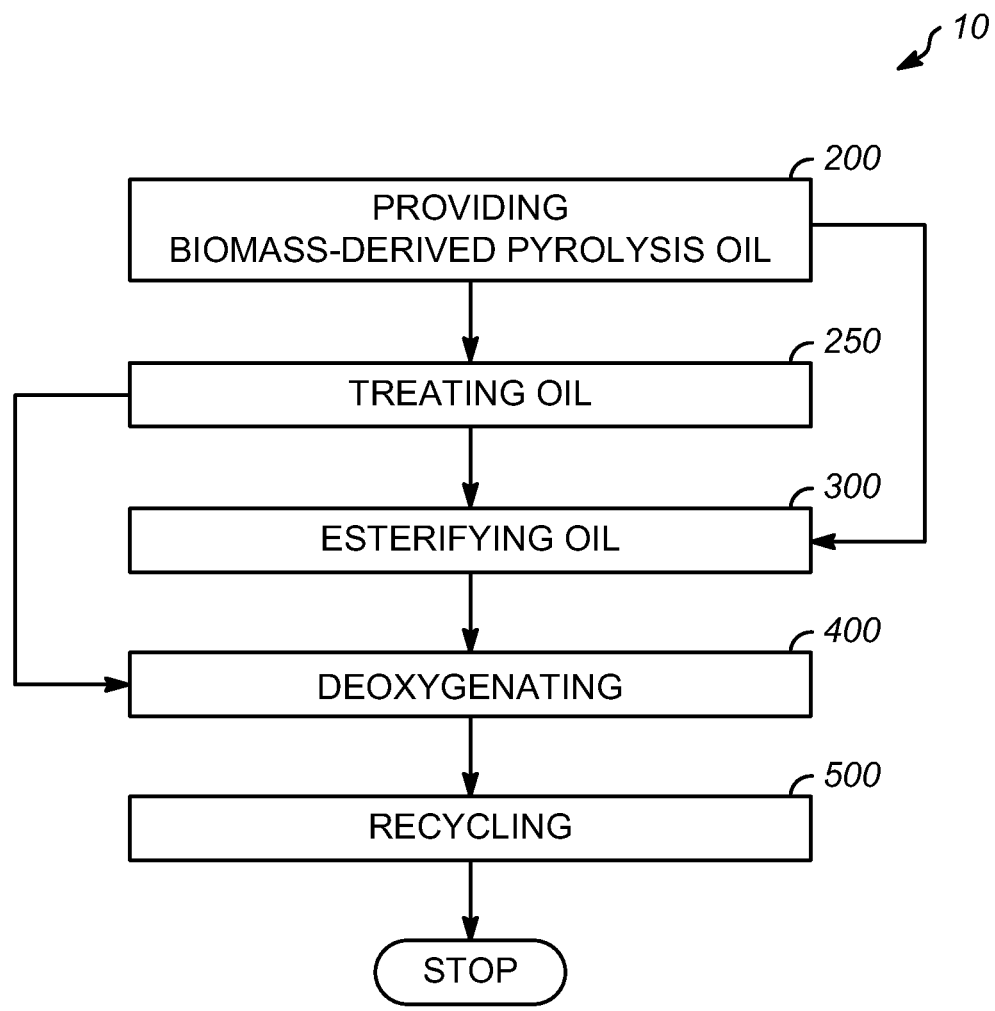
FIG. 1 is a flow diagram of a method for producing low oxygen biomass-derived pyrolysis oils, according to exemplary embodiments of the present invention.
Figure 2:
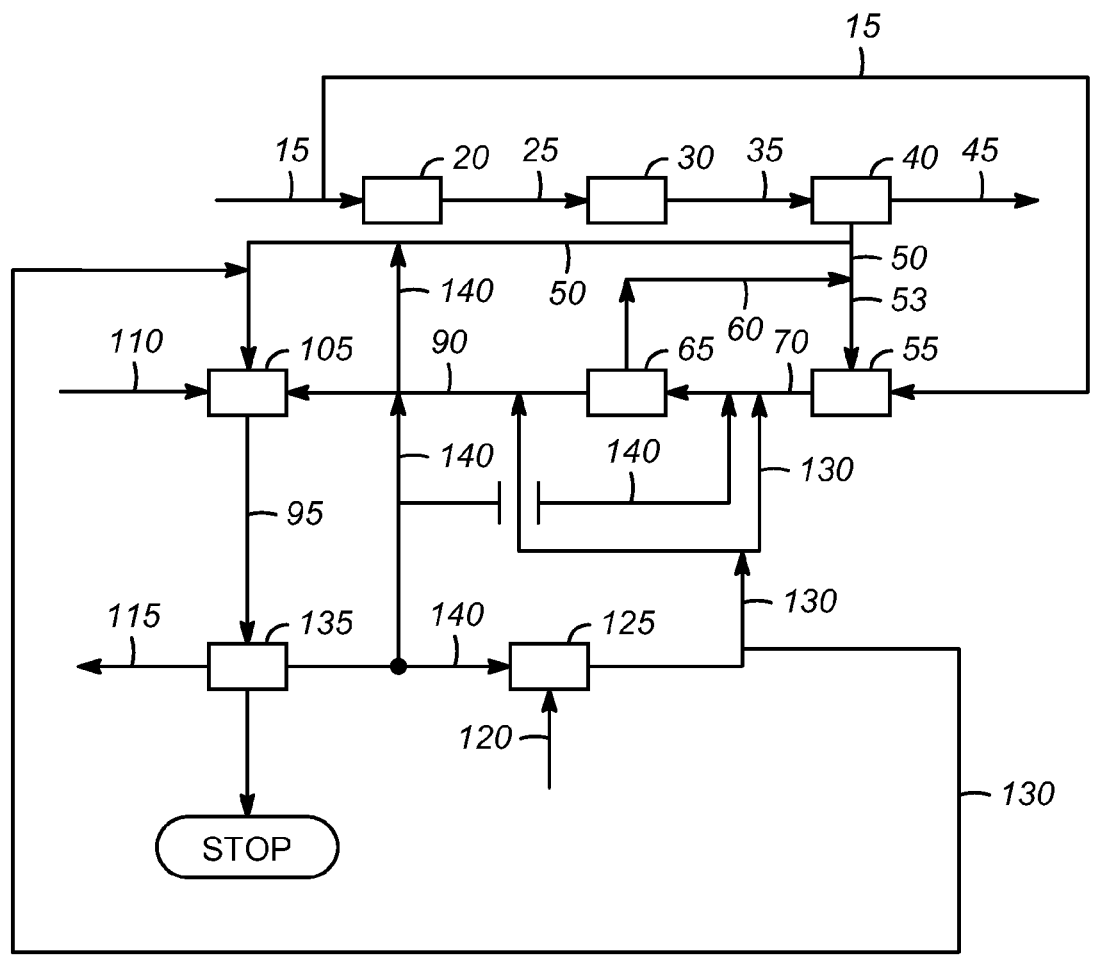
FIG. 2 is a diagram of the method of FIG. 1, according to exemplary embodiments of the present invention.

Referring to FIGS. 1 and 2, a method 10 for deoxygenating biomass-derived pyrolysis oil begins by providing biomass-derived pyrolysis oil 15 (step 200). Biomass-derived pyrolysis oil is available from, for example, Ensyn Technologies Inc., of Ontario, Canada. Biomass-derived pyrolysis oil is provided from a source such as a feed tank or other source operative to provide such conventional biomass-derived pyrolysis oil. Biomass-derived pyrolysis oil may be produced, for example, from pyrolysis of biomass in a pyrolysis reactor. Virtually any form of biomass can be used for pyrolysis to produce conventional biomass-derived pyrolysis oil. Biomass-derived pyrolysis oil may be derived from biomass material such as wood, agricultural wastes/residues, nuts and seeds, algae, grasses, forestry residues, or the like. The biomass-derived pyrolysis oil may be obtained by different modes of pyrolysis, such as fast pyrolysis, vacuum pyrolysis, catalytic pyrolysis, and slow pyrolysis (also known as carbonization) or the like. Biomass-derived pyrolysis oil composition is somewhat dependent on feedstock and processing variables. Conventional biomass-derived pyrolysis oil typically contains about 1000 to about 2000 ppm total metals, about 20-33 weight percent (wt. %) water with high acidity (total acid number (TAN)>150), and a solids content of about 0.1 wt. % to about 5 wt. %.

Still referring to FIGS. 1 and 2, in accordance with an exemplary embodiment, the conventional biomass-derived pyrolysis oil 15 may be treated to produce treated biomass-derived pyrolysis oil (step 250). To treat the biomass-derived pyrolysis oil, in one embodiment, the solids content is reduced to less than about 0.10%, preferably less than about 0.01%, the metals content is reduced to less than about 100 ppm, preferably less than about 20 ppm, and the water content is reduced to less than about 20 weight percent (wt. %), preferably less than about 15 wt. % (hereinafter "target levels"). In other embodiments, the biomass-derived pyrolysis oil may be treated to reduce just one or two of the solids content, the metals content, and the water content to the target levels.

Referring to FIG. 2, the biomass-derived pyrolysis oil 15 may be, for example, filtered in a filtration apparatus 20 to substantially remove particulate solids therefrom to form low solids biomass-derived pyrolysis oil 25, as hereinafter defined. The biomass-derived pyrolysis oil may be contacted in the filtration apparatus 20 with one or more filters (and filter media) for a selected period of time to produce a filtrate comprised of filtered biomass-derived pyrolysis oil and a filter cake. The filters may be used sequentially for treating the same volume of oil. The biomass-derived pyrolysis oil may be filtered using one or more of vacuum, gravity, or pressure filtration. The filtrate is removed from the filter cake and the filtrate (the biomass-derived pyrolysis oil) is recovered. For pressure filtration, pressurized gas such as nitrogen, air, or the like may be supplied on the input side of the filter to accelerate filtration. Pressures from about 1 atmosphere (atm) absolute pressure to about 8 atm absolute pressure may be used. The period of time required for filtration is dependent on volume and viscosity of the oil being filtered, the amount and particle size of solids to be removed, the filter media (composition and pore size), and filtration pressure and temperature. For vacuum filtration, negative pressure (i.e., a vacuum) of about 0.10 atm absolute pressure to about 0.95 atm absolute pressure may be supplied on the output side of the filter. No pressure is used for gravity filtration.

While filtration as a method to reduce solids in the biomass-derived pyrolysis oil has been described, other methods of reducing solids therefrom to the target level may be used in accordance with exemplary embodiments of the present invention. For example, other filtering methods, centrifugation, etc. may be used to reduce solids in the biomass-derived pyrolysis oil to obtain "low solids biomass-derived pyrolysis oil." "Low solids biomass-derived pyrolysis oil" as used herein means a biomass-derived pyrolysis oil having the target solids level of less than about 0.10%, preferably less than about 0.01%, solids. As used herein, "low solids" includes zero solids. Solids content in biomass-derived pyrolysis oil may be measured as described in the Annex to ASTM D7544-09 "Standard Specification for Pyrolysis Liquid Biofuel", or by other known methods.

Still referring to FIG. 2, to reduce the total metals content to the target level, the low solids biomass-derived pyrolysis oil 25 is treated by undergoing a metal reduction process, for example ion-exchange on an ion-exchange resin 30, to reduce the total metal concentration therein to the target level. The low solids biomass-derived pyrolysis oil 25 is contacted with the ion-exchange resin. The biomass-derived pyrolysis oil that contacts the ion-exchange resin undergoes ion exchange such that metal ions are captured by the ion-exchange resin. More specifically, the ion-exchange resin contains sulfonic acid at its active sites. When the biomass-derived pyrolysis oil contacts the resin, the metals preferentially migrate out of the oil to the active sites on the ion-exchange resin. The metals in the low solids biomass-derived pyrolysis oil 25 are replaced by hydrogen ions.

The ion-exchange can be accomplished by either a batch method or a continuous column method. In the batch method, the ion-exchange resin and biomass-derived pyrolysis oil are contacted by mixing the resin and oil in a resin vessel, batch tank, or the like. A given weight of ion-exchange resin is added to a known volume of low solids biomass-derived pyrolysis oil, as hereinafter described. The amount of ion-exchange resin added to the fixed amount of oil is typically an excess of resin (based on theoretical resin capacity, as defined below). The optimum resin to oil ratio is determined experimentally and is impacted by temperature and exposure time. The resin/oil mixture is agitated for about 0.5 hours to about 24 hours, preferably about 0.5 to about 4 hrs (hereinafter "the exposure time") at a temperature of about 10° C. to about 120° C., preferably from about 20° C. to about 60° C. Samples of the ion-exchanged oil may be collected and analyzed for metal content, as hereinafter described.

In the continuous column method, the ion-exchange resin and the low solids biomass-derived pyrolysis oil are contacted by passing the low solids biomass-derived pyrolysis oil 25 through a column (of one or more "beds") containing the ion-exchange resin. The resin temperature may be from about 10° C. to about 120° C., preferably from about 20° C. to about 60° C. The biomass-derived pyrolysis oil is passed through the column by positive pressure flow or by gravity flow. When pressure is applied, the absolute pressure is from greater than 0 KPa to about 13790 KPa (0 to about 2000 psi), preferably from greater than 0 KPa to about 689.5 KPa (greater than 0 psi to about 100 psi), and most preferably from about 13.8 KPa to about 206.8 KPa (about 2 psi to about 30 psi). When no pressure is applied, the low solids biomass-derived pyrolysis oil passes downward through the column and is allowed to slowly elute gravimetrically.

The low solids biomass-derived pyrolysis oil 25 is passed over the ion-exchange resin at a Liquid Hourly Space Velocity (LHSV) of about 0.1-20 hr$^{-1}$, preferably about 1-10 hr$^{-1}$. The faster the LHSV, the less time there is for the ion-exchange. When the LHSV is reduced, the concentration of the selected metal ions in the treated oil is reduced significantly.

When metal levels in the low solids biomass-derived pyrolysis oil reach a target concentration (i.e., target level), or when metal concentration is constant (as determined by repeat measurements) over an extended time period, contact between the oil and the resin may be concluded and ion-exchange is deemed "complete". Metal concentrations in biomass-derived pyrolysis oil may be measured by Atomic Absorption Spectroscopy (AAS), Inductively-Coupled Plasma-Atomic Absorption Spectroscopy (ICP-AAS), or other known methods.

The volume capacity of the ion-exchange resin ($VC_r$) for both batch and continuous column methods is the volume of resin needed to completely ion-exchange a given mass of oil and is determined by the equation:

$$VC_r(\text{mL resin/kg oil}) = (\Sigma_i(C_i*1000 \text{ g/kg})/MW_i)*V_i*1000 \text{ meq/eq}/(TC_r*D_r)$$

wherein:
$C_i$ is the concentration of metal i in the biomass-derived pyrolysis oil in gram metal/gram oil;
$MW_i$ is the molecular weight of metal in g/mol;
$V_i$ is the valency (charge) of metal i in solution;
$D_r$ is the ion-exchange resin density in g/mL; and
$TC_r$ is the theoretical capacity of resin r. Theoretical capacity ($TC_r$) is often expressed in terms of milliequivalents ions/gram resin.

The maximum volume of oil (in liters) that can be processed per unit volume of ion-exchange resin in both batch and continuous column methods is expressed as:

$$V_{oil} = V_r/(VC_r*D_{feed}),$$

wherein:
$V_{oil}$ is the volume of low solids biomass-derived pyrolysis oil in liters;
$D_{feed}$ is the feed oil (the starting biomass-derived pyrolysis oil) density (in kilograms/liter); $V_r$ is the resin volume in milliliters; and
$VC_r$ is the volume capacity of acidic ion-exchange resin to a given mass of metal-containing biomass-derived pyrolysis oil as determined above and expressed in mL resin/kg of biomass-derived pyrolysis oil. The $V_{oil}/V_r$ processed is also known as the number of bed volumes (BV) of oil processed. For a continuous column method, the volume of ion-exchange resin is fixed and a sub-theoretical volume of oil is passed through the ion-exchange resin. Filtered biomass-derived pyrolysis oil is contacted with about 0.1 to about 10 times the volume capacity ($VC_r$) of the acidic ion-exchange resin, preferably about 1 to about 5 VCr.

Resin efficiency, also referred to as ion-exchange efficiency ($IX_{eff}$), is defined as the fraction of metals removed from the liquid biomass-derived pyrolysis oil relative to the theoretical capacity of the resin and is determined as follows:

$$IXeff = (\Sigma(.(C_{if} - C_{ip})*V_i/MW_i*1000*M_f)))/(TC_r*M_r),$$

where $C_{if}$ and $C_{ip}$ are the concentration of metal i expressed in terms of grams of metal i per gram of oil in the feed (biomass-derived pyrolysis oil) and product (low metal biomass derived pyrolysis oil), respectively, $M_f$ is the mass of feed oil in grams, $MW_i$ is the molecular weight of metal i in g/mol, $V_i$ is the valency (charge) of metal i in solution, $TC_r$ is the theoretical capacity of resin r and $M_r$ is the mass in grams of resin r utilized. If it is assumed that a single metal ion neutralizes one resin exchange site regardless of ion charge, then the valance of the individual ions ($V_i$) is assigned as 1 for all metals. A higher exchange efficiency is typically desired. Theoretical resin capacity multiplied by the ion exchange efficiency provides the actual capacity, which is the amount of ion-exchange resin needed to actually deionize a given amount of biomass-derived pyrolysis oil. The lower the experimental resin capacity, i.e., the lower the concentration of acid sites (eq/L), the larger the column needs to be, i.e., the greater the resin volume needed to deionize the filtered biomass-derived pyrolysis oil.

Suitable ion-exchange resins useful in this process are strongly acidic cation-exchange resins. Preferably, the resin is used in the protonated form, i.e., all of the active groups are —SO$_3$H. Neutralized sulfonic acid resins, in which some or all of the protons have been exchanged by a cation such as lithium, sodium, potassium, magnesium, and calcium are also suitable. However, if resins are supplied with an alternate counterion (i.e., sodium, Na+), then the acid form may be generated prior to use by treatment with aqueous acid (such as hydrochloric, nitric, or sulfuric acid, etc.) This is commonly known in the art as ion-exchange resin activation. Preferably, the resin comprises sulfonated copolymers of styrene.

Preferred sulfonic acid resins are macroreticular resins. As used herein, "macroreticular resins" are made of two continuous phases—a continuous pore phase and a continuous gel polymeric phase. The continuous gel polymeric phase is structurally composed of small spherical microgel particles agglomerated together to form clusters, which, in turn, form interconnecting pores. The surface area arises from the exposed surface of the microgel clusters. Macroreticular ion exchange resins can be made with different surface areas ranging from 7 to 1500 m$^2$/g, and average pore diameters ranging from about 5 to about 10000 nm.

Gel-type resins may also be used. As used herein, "gel-type resins" are generally translucent. There are no permanent pore structures for the gel-type resins. The pores are generally considered to be molecular-scale micropores. The pore structures are determined by the distance between the polymer chains and crosslinks which vary with the crosslink level of the polymer, the polarity of the solvent, and the operating conditions. Macroreticular resins are preferable for continuous column ion-exchange applications where resin swelling/shrinking should be minimized, while gel-type resins are preferred for batch ion-exchange applications, but either type may be used in either application.

Exemplary suitable acidic ion-exchange resins include those manufactured by Dow Chemical Co., Midland, Mich. (USA) under the tradenames/trademarks DOWEX®MARATHON C, DOWEX® MONOSPHERE C-350, DOWEX® HCR-S/S, DOWEX® MARATHON MSC, DOWEX® MONOSPHERE 650C, DOWEX® HCR-W2, DOWEX® MSC-1, DOWEX® HGR NG (H), DOWE® DR-G8, DOWEX® 88, DOWEX® MONOSPHERE 88, DOWEX® MONOSPHERE C-600 B, DOWEX® MONOSPHERE M-31, DOWEX® MONOSPHERE DR-2030, DOWEX® M-31, DOWEX® G-26 (H), DOWEX® 50W-X4, DOWEX® 50W-X8, DOWEX® 66, those manufactured by Rohm and Haas, Philadelphia, Pa. (USA) under the tradenames/trademarks Amberlyst® 131, Amberlyst® 15, Amberlyst® 16, Amberlyst® 31, Amberlyst® 33, Amberlyst® 35, Amberlyst® 36, Amberlyst® 39, Amberlyst® 40 Amberlyst® 70, Amberlite® FPC11, Amberlite® FPC22, Amberlite® FPC23, those manufactured by Brotech Corp., Bala Cynwyd, Pa. (USA) under the tradnames/trademarks Purofine® PFC150, Purolite® C145, Purolite® C150, Purolite® C160, Purofine® PFC100, Purolite® C100, and those manufactured by Thermax Limited Corp., Novi, Mich. (USA) under the tradename/trademark Monoplus™ S100 and Tulsion® T42.

A "low solids, low metal biomass derived pyrolysis oil" 35 having the target level of total metals of less than about 100 ppm, preferably less than about 20 ppm is produced from ion-exchange. As used herein, "low metals" includes zero metals. The low solids, low metal biomass-derived pyrolysis oil 35 is then removed from the used ion-exchange resin (hereinafter "spent ion-exchange resin"). In a batch ion-exchange, the low solids, low metal biomass-derived pyrolysis oil may be removed by filtration, decantation, or other known method. In continuous column ion exchange, the low solids, low metal biomass-derived pyrolysis oil is removed from the spent ion-exchange resin when the low solids, low metal biomass-derived pyrolysis oil elutes from the column gravimetrically or under positive pressure. While particular ion-exchange methods have been described, other methods of reducing the total metal content to the target level may be used in accordance with exemplary embodiments of the present invention.

Still referring to FIG. 2, the low solids, low metal biomass-derived pyrolysis oil 35 may be subjected to an azeotropic, vacuum, gas-assisted, or atmospheric distillation process in a first fractionator 40 such as a distillation apparatus to remove at least a portion of the water 45 therein to reduce the water content therein to the target level. Azeotropic, vacuum, and gas-assisted distillation processes permit the removal of water from biomass-derived pyrolysis oil without having to heat the oil to at least 100° C. (the boiling point of water at one atmosphere) to remove the water, i.e., such processes allow atmospheric distillation at lower temperatures. The use of lower temperatures to remove the water from the oil substantially prevents solidification (phase separation) of the oil that is experienced at elevated temperatures (typically about 150° C.).

Vacuum distillation is performed at lower than atmospheric pressure to lower the boiling point of the water in the biomass-derived pyrolysis oil so that water therein may be removed by heating the biomass-derived pyrolysis oil at least to the lower boiling point of water at that reduced pressure. The boiling point of water at that pressure may be determined by consulting temperature/pressure charts that are available from, for example, the National Bureau of Standards (NBS)/National Research Council (NRC). Vacuum may be applied by a vacuum pump, aspirator, or the like. In a preferred embodiment, the biomass-derived pyrolysis oil is heated to about 65° C. at a vacuum of about 0.05 to about 0.95 atm (absolute pressure) until the desired amount of water is removed to reach the target level.

Gas-assisted distillation uses a standard distillation column with an inert gas such as nitrogen, air, argon, helium, hydrogen or other gas passing into and over the low metal, water-containing biomass-derived pyrolysis oil while heating the low metal biomass-derived pyrolysis oil to a selected temperature of about 30° C. to about 90° C., preferably about 70° C. at a flow rate of about 0.1 to about 100 liters (L) gas/L oil/minute, preferably about 0.5 to about 4 L gas/L oil/min. Gas-assisted distillation functionally reduces the vapor pressure of the oil, thus resulting in more water in vapor phase so that it can be removed from the low metal biomass-derived pyrolysis oil at less than 100° C. The rate at which the water is removed is limited by the vapor pressure of water at the selected temperature, the gas flow rate, and the liquid volume to be distilled. The gas flow rate (controlled by a mass flow controller or valve) and selected temperature may be varied depending on the desired rate of water removal. The wt. % water in the starting and treated biomass-derived pyrolysis oil may be measured, for example, by the Karl Fischer Reagent Titration Method (ASTM D1364) as known to one skilled in the art. Preferably, the treated biomass-derived pyrolysis oil contains less than 20 weight percent water (the "target level").

As a result of fractionation in the first fractionator, the treated biomass-derived pyrolysis oil 50 comprising a low solids, low metal, low water biomass-derived pyrolysis oil is produced. "Low water biomass derived pyrolysis oil" means an oil having the target level of water of less than about 20 weight percent (wt. %), preferably less than about 15 wt. %. As used herein, "low water" includes zero water. While particular methods for reducing the water content in biomass-derived pyrolysis oil have been described, other methods of reducing water in biomass-derived pyrolysis oil known to those skilled in the art may be used.

It is to be understood that while solids removal, metal removal, and water removal have been described sequentially for illustrative purposes, such that the low metal biomass-derived pyrolysis oil is also "low solids" and the "low water biomass-derived pyrolysis oil" is also low metals and low solids, it is to be noted that solids removal, metal removal, or water removal, if performed, may be performed by itself or in any sequence to form the treated biomass-derived pyrolysis oil.

Referring again to FIGS. 1 and 2, in one embodiment, method 10 continues by optionally esterifying the treated biomass-derived pyrolysis oil 50 from step 250 to reduce the carboxylic total acid number (TAN) therein to a desired target level of less than 40. In this regard, the treated biomass-derived pyrolysis oil 50 is esterified in the presence of alcohol 60 to form the low-acid biomass-derived pyrolysis oil (step 300). The treated biomass-derived pyrolysis oil 50 is diluted with the alcohol 60 to form a solution 53. The alcohol 60 employed for esterification includes, but is not limited to aliphatic alcohols, such as methanol, ethanol, propanol, and butanol.

Diluting can be achieved by placing a predetermined volume of the treated biomass-derived pyrolysis oil in a container, such as a tank, vessel or the like, and adding the ethanol to the container to form the solution. In an example, an amount of ethanol is added to the treated biomass-derived pyrolysis oil such that the solution 53 includes at least 15% alcohol by weight. In other embodiments, more or less alcohol is added to the solution.

The solution 53 is esterified at a temperature and a pressure that are at supercritical or just below critical limitations of the alcohol. For example, esterification can be performed at a temperature in a range of from about 180° C. to about 290° C. at a pressure of at least about 4.41 MPa to about 8.00 MPa (640 psig to about 1160 psig). In other embodiments, the particular temperatures and/or pressures employed are selected based on the alcohol included in the solution 53. In any case, the solution is esterified for a residence time in a range of about 0.5 hour to about 3 hours. In other embodiments, esterification occurs for a longer or shorter time period. Esterification preferably occurs in the absence of gas. In this regard, an inert gas, such as nitrogen, can be employed to evacuate the atmosphere in which esterification occurs, and a vacuum seal may be formed after the atmosphere is substantially completely evacuated.

Figure 3:
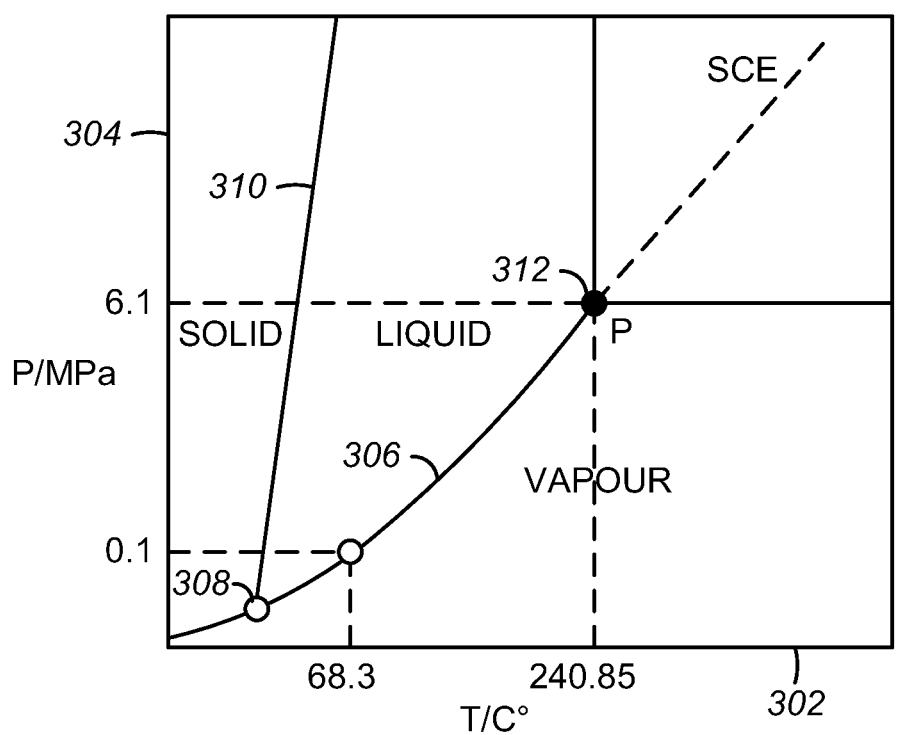
FIG. 3 is a phase diagram for pure ethanol.

The solution 53 is passed through a reactor 55 under supercritical conditions or near critical conditions of alcohol to esterify the acids in the solution 53. As used herein, the term "supercritical conditions" is defined as a temperature and pressure above a critical point of the alcohol. The terms "just below critical" and "near critical" mean +/−10% on temperature and pressure. FIG. 3 is a phase diagram for pure ethanol. The phase diagram includes an x-axis 302 representing temperature as measured in ° C. and a y-axis 304 representing pressure as measured in megaPascals (MPa). Line 306 includes a triple point 308 from which another line 310 extends to thereby indicate a phase change threshold between the solid, liquid, and vapor phases of ethanol. Line 306 further includes a critical point 312 at which the liquid and gaseous phase of ethanol become substantially identical. The critical point 312 for ethanol is at about 243° C. and about 6.38 MPa (925 psi). As shown in FIG. 3, points along line 306 beyond the critical point 312 correspond to supercritical conditions. Other aliphatic alcohols employed during esterification have critical points that are different from that of ethanol. For example, the critical point of methanol is at about 240° C. and about 7.95 MPa (1153 psi). The critical point of propanol is at about 268.6° C. and about 5.16 MPa (749 psi), and the critical point of butanol is at about 289.8° C. and about 4.42 MPa (641 psi).

The reactor may be an upflow tubular reactor with or without a fixed catalyst bed. Although the preferred reactor comprises the upflow tubular reactor, downflow reactors can be employed in some embodiments. Suitable types of reactors include, but are not limited to fluidized bed systems, batch reactors, continuously stirred reactors, and the like. No matter the particular type of reactor employed, the esterification catalyst composition can be simply placed within the reactor or on the catalyst bed for reaction with the solution.

According to an embodiment, esterification is performed in the absence of an esterification catalyst composition. In accordance with another embodiment, esterification is performed in the presence of a catalyst composition. As used herein, an "esterification catalyst composition" is defined as solid composition comprising at least an active phase. The esterification catalyst composition is selected to reduce the total acid number of the acid-containing biomass-derived pyrolysis oil. In this regard, suitable esterification catalyst compositions comprise solid acid catalysts, solid base catalysts, or catalytic metals dispersed on a solid support, such as those typically employed for hydroprocessing. Exemplary solid acid catalysts include, but are not limited to, molecular sieves, metal oxides, and sulfated metal oxides. Suitable molecular sieves include, but are not limited to, zeolites and MCM 41. The zeolite can be selected from BEA-type zeolites, zeolite X, zeolite Y, zeolite ZSM 5, and zeolite ZSM 12. Metal oxides useful as solid acid esterification catalysts include those selected from Group IV metal oxides and Group V metal oxides. For example, Group IV metal oxides include, but are not limited to titanium oxide ($TiO_2$) and zirconium oxide ($ZrO_2$). Group V metal oxides include niobium oxide ($Nb_2O_5$). In other embodiments, other Group IV and V metal oxides and mixtures thereof can alternatively be employed. Sulfated metal oxides used as solid acid catalysts include sulfated zirconia. The aforementioned solid acid catalysts are intended for use as standalone catalysts. Hence, the solid acid catalyst is not employed with a support material.

The solid base catalysts include, but are not limited to basic metal oxides and alkaline-earth metal exchanged molecular sieves. Suitable basic metal oxides employed as solid base catalysts include, but are not limited to calcium oxide (CaO), magnesium oxide (MgO), and other basic metal oxides. Exemplary alkaline-earth metal exchanged molecular sieves suitable for inclusion as the catalyst compositions include, but are not limited to, barium exchanged molecular sieves, calcium exchanged molecular sieves, and the like. The aforementioned solid base catalysts are intended for use as standalone catalysts. Hence, the solid base catalyst is not employed with a support material.

In other embodiments, the esterification catalyst composition may comprise one or more metals dispersed on a metal oxide support. The metal may be dispersed on the support as the oxide, sulfide or as the metal (zero valent state). Examples of supported catalyst compositions which may be used are those employed for hydroprocessing. For example, the catalytic metals can comprise one or more noble metals or non-noble metals. In an embodiment, the noble metal may be present in an amount from about 0.1 wt. % to about 1.5 wt. % of the esterification catalyst composition. As used herein, wt. % means the weight of the catalytic metal (as the metal) divided by the total weight of the catalytic composition (catalytic metal weight plus weight of the support). Suitable noble metals include, but are not limited to, gold (Au), platinum (Pt), rhodium (Rh), ruthenium (Ru), palladium (Pd), and iridium (Ir).

If a non-noble metal is used, the non-noble metal can be selected from nickel (Ni), cobalt (Co), molybdenum (Mo), tungsten (W), and combinations thereof. For example, metals such as Ni/Mo, Co/Mo, Ni/Co/Mo, Ni/W, and combinations thereof, may be employed. If the catalytic metals are Ni/Mo, the metals may be present in an amount from about 0.5 wt. % to about 3.5 wt. % of nickel, and about 5 wt % to about 20 wt. % of molybdenum. In an embodiment in which Co/Mo are the catalytic metals, the metals may be present from about 0.5 wt. % to about 3.5 wt. % of cobalt and about 5 wt. % to about 20 wt. % of molybdenum. If Ni/Co/Mo are the catalytic metals, the metals may be present from about 0.1 wt. % to about 1.5 wt. % of nickel, about 0.5 wt. % to about 3.5 wt. % of cobalt, and about 5 wt. % to about 20 wt. % of molybdenum. For the case of Ni/W, the metal concentration comprises about 0.5% to about 3.5% of nickel, and about 5% to about 20% of tungsten.

The support materials for the esterification catalyst composition include metal oxide support materials, including, but not limited to a Group IV metal oxide, a Group V metal oxide, and a Group IIIA metal oxide. The metal oxide support material can be selected from titanium oxide ($TiO_2$), zirconium oxide ($ZrO_2$), niobium oxide ($Nb_2O_5$), quartz, silicon carbide, aluminum oxide ($Al_2O_3$), and silicon oxide ($SiO_2$).

In another embodiment, the catalyst material comprises a sulfated metal oxide. For example, the sulfated metal oxide comprises sulfated zirconia. The sulfated metal oxide can support a metal, in an embodiment. In an example, the metal is a noble metal. In such case, the noble metal comprises palladium.

As a result of esterification, the acids in the biomass-derived pyrolysis oil are converted into esters to thereby yield a low acid biomass-derived pyrolysis oil 70. While generally described as a "low acid biomass-derived pyrolysis oil", this term generally includes any oil produced having a lower total acid number than conventional biomass-derived pyrolysis oil. The term "low acid biomass-derived pyrolysis oil" also includes oil having no acid species. For example, light carboxylic acids (e.g., acids having $C_1$-$C_4$) are converted to volatile esters. As used herein, "volatile esters" have a boiling point below or equal to the normal boiling point of the ethanol. In some cases, about 80% to about 95% of the light carboxylic acids are converted, thereby reducing the TAN of the biomass-derived pyrolysis oil by about 5% by weight.

Exemplary equations of the reactions that may occur within the biomass-derived pyrolysis oil are provided below.

Formic Acid+Ethanol→Water+Ethyl Formate $$HCOOH+CH_3CH_2OH\rightarrow H_2O+HCOOCH_2CH_3$$

Acetic acid+Ethanol→Water+Ethyl Acetate $$CH_3COOH+CH_3CH_2OH\rightarrow H_2O+CH_3COOCH_2CH_3$$

Propionic Acid+Ethanol→Water+Ethyl Propionate $$CH_3CH_2COOH+CH_3CH_2OH\rightarrow H_2O+CH_3CH_2COOCH_2CH_3$$

Butanoic Acid+Ethanol→Water+Ethyl Butyrate $$CH_3CH_2CH_2COOH+CH_3CH_2OH\rightarrow H_2O+CH_3CH_2CH_2COOCH_2CH_3$$

Referring again to FIG. 2, optionally, after esterification, the low acid biomass-derived pyrolysis oil 70 may undergo fractionation in a second fractionator 65 to remove ethanol therefrom. The removed ethanol can be recycled and returned to the reactor for use as the supercritical alcohol 60 in later esterification steps. The remaining low acid biomass-derived pyrolysis oil, now comprising volatile esters, forms the esterified biomass-derived pyrolysis oil 90. Fractionation can be achieved in the second fractionator 65 by providing a temperature gradient along a fractionation column, where a minimum temperature of the temperature gradient is set just above the boiling point of ethanol. A fraction of the low acid biomass-derived pyrolysis oil (e.g., the ethanol) is collected at a location along the temperature gradient, distilled and directed to a separate container. While TAN reduction using esterification with an esterification catalyst and supercritical ethanol has been described, the total acid number (inclusive of the carboxylic acid number) may be further reduced by other methods known in the art, including but not limited to other esterification methods.

In accordance with another exemplary embodiment, also illustrated in FIGS. 1 and 2, conventional biomass-derived pyrolysis oil 15 may be esterified in the reactor 55 in the same manner as previously described with respect to the esterification of the treated biomass-derived pyrolysis oil 50 to produce the esterified biomass-derived pyrolysis oil 90.

Referring again to FIGS. 1 and 2, method 10 continues with deoxygenating the treated biomass-derived pyrolysis oil from step 250 (i.e., the non-esterified oil) or the esterified biomass-derived pyrolysis oil from step 300 (step 400). The treated or esterified biomass-derived pyrolysis oil is deoxygenated by exposing it to a first catalyst in the presence of hydrogen-containing gas 110 at first hydroprocessing conditions in a first hydroprocessing reactor 105 to produce a solution 95 of partially deoxygenated biomass-derived pyrolysis oil and water. A partially deoxygenated biomass-derived pyrolysis oil contains residual oxygenated hydrocarbons. The first catalyst comprises a metal on a neutral catalyst support. As used herein, a "neutral catalyst support" is defined as one that shows less than 15% total conversion of 1-heptene in a catalytic test reactor as follows: 0.25 g of solid support material (ground and sieved to 40/60 mesh) is loaded in a tubular reactor and heated under flowing hydrogen (1 atmosphere, upflow) to 550° C. for 60 minutes. The tubular reactor is cooled to 425° C., hydrogen flow rate is set at 1 slm (standard liter per minute) and then 1-heptene is introduced to the catalyst bed (by injection into or saturation of the hydrogen stream) at a rate of ~0.085 g/min. Conversion of 1-heptene is defined by 100*(1−X(heptene)) where X is the mol fraction 1-heptene in the hydrocarbon product as determined by gas chromatographic analysis of the reactor effluent stream. Various options for gas chromatographic analysis as known in the art are suitable, and other analytical methods known in the art may be substituted for gas chromatographic analysis as long as a mole fraction of n-heptene in the product may be calculated.

Exemplary neutral catalyst supports comprise a carbon support, a non-alumina metal oxide support, a theta alumina support, or a support comprising a combination thereof. The non-alumina metal oxide support comprises a titanium oxide ($TiO_2$) support, a silicon oxide support, a zirconia oxide ($ZrO_2$) support, a niobium oxide ($Nb_2O_5$) support, or a support comprising mixtures of the non-alumina metal oxides. The metal oxide support may be mixed with one or more additional components to improve the physical and/or phase stability of the metal oxide. Components that improve physical stability include, but are not limited to, carbon, metal oxides, and clays as known in the art. Components that improve phase stability include, but are not limited to, base metals, transition metals, non-metals, and lanthanide metals. "Theta alumina" as used herein refers to alumina having a crystallinity as measured by X-ray diffraction corresponding to that characterized in the Joint Committee on Powder Diffraction Standards number 23-1009.

Catalysts having a neutral catalyst support comprise a metal. The metal can be a noble metal, or a Group VIII non-noble metal and a Group VIB non-noble metal. The noble metal comprises rhodium (Rh), palladium (Pd), gold (Au), and ruthenium (Ru), or combinations thereof. The noble metal comprises about 0.1 to about 5 weight percent of the catalyst having the neutral catalyst support. The effective amount of the catalyst is expressed as a catalyst to oil ratio of about 0.1 to about 10 weight of catalyst per hourly weight feed rate of treated biomass-derived pyrolysis oil.

The Group VIII non-noble metal comprises cobalt, nickel, or both. The Group VIB non-noble metal comprises molybdenum or tungsten. The Group VIB and Group VIII non-noble metals are optionally sulfided. The molar ratio of Group VIB non-noble metals to Group VIII non-noble metals ranges from about 10:1 to about 1:10. The weight percent of nickel and cobalt comprises from about 0.1 to about 5 weight percent of the total weight of the catalyst, the cobalt calculated as an oxide and the weight percent of the molybdenum and of the tungsten in the catalyst comprises from about 5 to about 20 weight percent of the total weight of the catalyst, the molybdenum calculated as an oxide. The term "calculated as an oxide" means that the metal is calculated as a metal oxide. When metals are initially incorporated onto the neutral catalyst support, they may be present as the metal oxide, rather than in the metallic state. Therefore, as used herein, if the metal is "calculated as an oxide", that means the catalyst has x % metal oxide. The actual amount of the metal will be somewhat lower depending on the stoichiometry of the specific oxide. The oxide is removed during deoxygenation. Exemplary metals for the catalysts are listed in the FIG. 4 table, with the corresponding neutral catalyst supports listed in FIG. 5. The weight % metals identified in the cells of the table of FIG. 4 are arranged from low to high, with the preferred wt. % shown between the low and high values.

The treated biomass-derived pyrolysis oil or the esterified biomass-derived pyrolysis oils are exposed to the first catalyst having a neutral catalyst support under first hydroprocessing conditions to partially deoxygenate the esterified biomass-derived pyrolysis oil by converting a portion of the oxygenated hydrocarbons therein into hydrocarbons. As noted previously, partially deoxygenated biomass-derived pyrolysis oil 140 contains residual oxygenated hydrocarbons.

The first hydroprocessing conditions comprise a reaction temperature in the range of about 100° C. to about 400° C., a pressure of about 3204 kPa to about 12410 kPa (about 450 to about 1800 psig), a liquid hourly space velocity of about 0.25 volume of liquid feed/volume of catalyst/hour (V/V/Hr) to about 1.0 V/V/Hr, and a hydrogen-containing gas treat rate of about 1000 SCF/B to about 12000 SCF/B. Deoxygenation may be performed in a hydroprocessing reactor such as a fixed bed tubular reactor, a stir tank reactor, or both.

Still referring to FIG. 2, the water 115 in the solution 95 of partially deoxygenated biomass-derived pyrolysis oil is phase separated from the partially deoxygenated biomass-derived pyrolysis oil in a separator 135. The resultant partially deoxygenated biomass-derived pyrolysis oil 140 may then be further deoxygenated by exposing it to a second catalyst in the presence of additional hydrogen-containing gas 120 at second hydroprocessing conditions in a second hydroprocessing reactor 125 to convert the residual oxygenated hydrocarbons in the partially deoxygenated biomass-derived pyrolysis oil into hydrocarbons. In this case, the low oxygen biomass-derived pyrolysis oil is substantially fully deoxygenated, i.e., a hydrocarbon product 130 (i.e., oxygen-free). The second catalyst comprises a conventional hydroprocessing catalyst such as HCT (nickel and molybdenum on a gamma alumina support) or others well known in the art. The second hydroprocessing conditions comprise a reaction temperature in the range of about 300° C. to about 350° C., a pressure of about 3549 kPa to about 12410 kPa (500 psig to about 1800 psig), a liquid hourly space velocity of about 0.5 V/V/Hr to about 1.5 V/V/Hr, and a hydrogen-containing gas treat rate of about 400 SCF/B to about 8000 SCF/B. The second hydroprocessing reactor may be a reactor such as a fixed bed tubular reactor, a stir tank reactor, or both.

The minimum total amount of hydrogen-containing gas 110 and additional hydrogen-containing gas 120 needed to convert substantially all of the oxygenated hydrocarbons in the treated biomass-derived pyrolysis oil and the esterified biomass-derived pyrolysis oil comprises 1-2 equivalents of hydrogen-containing gas per one equivalent of non-water oxygen. The non-water oxygen in the treated biomass-derived pyrolysis oil and in the esterified biomass-derived pyrolysis oil is derived from the functional groups of the oxygenated hydrocarbons therein. For example, one equivalent of an alcohol functional group and a ketone functional group requires 1 equivalent of hydrogen-containing gas for deoxygenation whereas one equivalent of an ester functional group requires 2 equivalents of hydrogen-containing gas, and 1 equivalent of a carboxylic acid functional group requires 1.5 equivalents of hydrogen-containing gas. Therefore, for example, the more esters and carboxylic acids present in the treated biomass-derived pyrolysis oil or in the esterified biomass-derived pyrolysis oil, the more hydrogen-containing gas is necessary for conversion of all the oxygenated hydrocarbons therein into hydrocarbons. The minimum amount of hydrogen-containing gas to substantially deoxygenate the treated biomass-derived pyrolysis oil or the esterified biomass-derived pyrolysis oil is equal to about one to about three molar equivalents of the non-water oxygen therein. The amount of non-water oxygen=A−B wherein A is the total amount of oxygen in the biomass-derived pyrolysis oil (treated or esterified) as determined by combustion method, as known in the art and B is the total amount of oxygen in the water in the biomass-derived pyrolysis oil (treated or esterified). To determine B, the total water content in the biomass-derived pyrolysis oil is first determined by the Karl Fischer Reagent Titration Method (ASTM D1364) as known to one skilled in the art. An excess of hydrogen-containing gas may also be used.

Referring again to FIGS. 1 and 2, method 10 continues with recycling a portion of the low oxygen biomass-derived pyrolysis oil (the partially deoxygenated biomass-derived pyrolysis oil 140, the fully deoxygenated biomass-derived pyrolysis oil 130 (i.e., the hydrocarbon product), or both), to thereafter dilute the esterified biomass-derived pyrolysis oil 90, the low acid biomass-derived pyrolysis oil 70 (if fractionation in the second fractionator 65 is not performed), or the treated biomass-derived pyrolysis oil 50 (if esterification is not performed) prior to deoxygenation of subsequent feeds of treated or esterified biomass-derived pyrolysis oil (step 500). Recycling a portion of the low oxygen biomass-derived pyrolysis oil also helps control the temperature of the highly exothermic deoxygenation reaction. The benefits of recycling a portion of the low oxygen biomass-derived pyrolysis oil include, but are not limited to, increasing hydrogen solubility, immolation of the exotherm by dilution of the reactive species, and by reducing the reaction rate of bimolecular reactors that lead to fouling of the catalyst. The amount of the recycled low oxygen biomass-derived pyrolysis oil exceeds the amount of the esterified, low acid, or treated (90, 70, 50) biomass-derived pyrolysis oil in the subsequent feed. The preferred ratio of recycled low oxygen biomass-derived pyrolysis oil to the esterified, low acid, or treated biomass-derived oil comprises a ratio of about 1.5:1 to about 5:1.

While the production of partially deoxygenated biomass-derived pyrolysis oil in the first hydroprocessing reactor 105 has been described, the treated biomass-derived pyrolysis oil from step 250 and the esterified biomass-derived pyrolysis oil from step 300 may be fully deoxygenated at modified first hydroprocessing conditions in the first hydroprocessing reactor 105. The modified hydroprocessing conditions comprise a reaction temperature in the range of about 300° C. to about 420° C., a pressure of about 4136 kPa to about 12410 kPa (about 600 psig to about 1800 psig), a liquid hourly space velocity of about 0.05 V/V/Hr to about 0.25 V/V/Hr, and a hydrogen-containing gas treat rate of about 4000 SCF/B to about 13500 SCF/B. Should full deoxygenation occur in the first hydroprocessing reactor 105, no further deoxygenation is necessary, as indicated by the "stop" in FIG. 2.

From the foregoing, it is to be appreciated that the low oxygen biomass-derived pyrolysis oil produced in accordance with exemplary embodiments of the present invention is more suitable for use and processing as a biofuel. In addition, the plugging that occurs with conventional deoxygenation is substantially reduced, providing for increased hydroprocessing run times, and improved processibility of the biomass-derived pyrolysis oil.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention, it being understood that various changes may be made in the function and arrangement of elements described in an exemplary embodiment without departing from the scope of the invention as set forth in the appended claims and their legal equivalents.

What is claimed is:

1. A method for producing low oxygen biomass-derived pyrolysis oil, the method comprising the steps of:
   reducing the solids content of biomass-derived pyrolysis oil to less than about 0.10%;
   reducing the total metals content thereof to less than about 100 ppm;
   reducing the water content thereof to less than about 20 weight percent (wt. %), the steps of reducing the solids content, the metals content, and the water content producing a treated biomass-derived pyrolysis oil; and
   esterifying the treated biomass-derived pyrolysis oil followed by deoxygenating the treated biomass-derived pyrolysis oil in the presence of a hydrogen containing gas and a catalyst.

2. The method of claim 1, wherein the step of deoxygenating comprises deoxygenating in the presence of hydrogen-containing gas and a first catalyst having a neutral catalyst support at first hydroprocessing conditions comprising a reaction temperature in the range of about 100° C. to about 400° C., a pressure of about 3204 kPa to about 12410 kPa (450 to about 1800 psig), a liquid hourly space velocity of about 0.25 volume of liquid feed/volume of catalyst/hour (V/V/Hr) to about 1.0 V/V/Hr, and a hydrogen-containing gas treat rate of about 1000 SCF/B to about 12000 SCF/B.

3. The method of claim 2, wherein the step of deoxygenating further comprises deoxygenating in the presence of a second catalyst and additional hydrogen-containing gas at second hydroprocessing conditions comprising a reaction temperature in the range of about 300° C. to about 350° C., a pressure of about 3549 kPa to about 12410 kPa (500 psig to about 1800 psig), a liquid hourly space velocity of about 0.5 V/V/Hr to about 1.5 V/V/Hr, and a hydrogen-containing gas treat rate of about 400 SCF/B to about 8000 SCF/B.

4. The method of claim 1, wherein the step of deoxygenating comprises deoxygenating in the presence of hydrogen-containing gas and a first catalyst having a neutral catalyst support at modified first hydroprocessing conditions, the modified first hydroprocessing conditions comprising a reaction temperature in the range of about 300° C. to about 420° C., a pressure of about 4136 kPa to about 12410 kPa (about 600 psig to about 1800 psig), a liquid hourly space velocity of about 0.05 V/V/Hr to about 0.25 V/V/Hr, and a hydrogen-containing gas treat rate of about 4000 SCF/B to about 13500 SCF/B.

5. The method of claim 1, wherein the step of esterifying comprises esterifying with ethanol in the presence of an esterification catalyst under supercritical or near critical conditions to produce low acid biomass-derived pyrolysis oil, the method further comprising the step of removing the ethanol from the low acid biomass-derived pyrolysis oil to produce the esterified biomass-derived pyrolysis oil.

6. The method of claim 5, further comprising the step of recycling a portion of the low oxygen biomass-derived pyrolysis oil.

7. The method of claim 6, wherein the step of recycling comprises recycling in a ratio of about 1.5:1 to about 5:1 low oxygen biomass-derived pyrolysis oil to esterified biomass-derived oil.

8. A method for producing low oxygen biomass-derived pyrolysis oil, the method comprising the steps of:
   treating the biomass-derived pyrolysis oil prior to the esterification step by:
      reducing the solids content of biomass-derived pyrolysis oil to less than about 0.10%;
      reducing the total metals content thereof to less than about 100 ppm; and
      reducing the water content thereof to less than about 20 weight percent (wt. %);
   esterifying biomass-derived pyrolysis oil to produce esterified biomass-derived pyrolysis oil; and
   deoxygenating the esterified biomass-derived pyrolysis oil.

9. The method of claim 8, wherein the step of esterifying comprises esterifying with ethanol in the presence of an esterification catalyst under supercritical or near critical conditions to produce low acid biomass-derived pyrolysis oil, the method further comprising the step of removing the ethanol from the low acid biomass-derived pyrolysis oil prior to the deoxygenating step.

10. The method of claim 9, further comprising the step of recycling a portion of the low oxygen biomass-derived pyrolysis oil.

11. The method of claim 10, wherein the step of recycling comprises recycling in a ratio of about 1.5:1 to about 5:1 low oxygen biomass-derived pyrolysis oil to esterified biomass-derived pyrolysis oil.

12. The method of claim 8, wherein the step of deoxygenating comprises deoxygenating in the presence of hydrogen-containing gas and a first catalyst having a neutral catalyst support at first hydroprocessing conditions comprising a reaction temperature in the range of about 100° C. to about 400° C., a pressure of about 3204 kPa to about 12410 kPa (450 to about 1800 psig), a liquid hourly space velocity of about 0.25 volume of liquid feed/volume of catalyst/hour (V/V/Hr) to about 1.0 V/V/Hr, and a hydrogen-containing gas treat rate of about 1000 SCF/B to about 12000 SCF/B.

13. The method of claim 8, wherein the step of deoxygenating comprises deoxygenating in the presence of hydrogen-containing gas and a first catalyst having a neutral catalyst support at modified first hydroprocessing conditions, the modified first hydroprocessing conditions comprising a reaction temperature in the range of about 300° C. to about 420° C., a pressure of about 4136 kPa to about 12410 kPa (about 600 psig to about 1800 psig), a liquid hourly space velocity of about 0.05 V/V/Hr to about 0.25 V/V/Hr, and a hydrogen-containing gas treat rate of about 4000 SCF/B to about 13500 SCF/B.

14. The method of claim 12, wherein the step of deoxygenating further comprises deoxygenating in the presence of a second catalyst and additional hydrogen-containing gas at second hydroprocessing conditions comprising a reaction temperature in the range of about 300° C. to about 350° C., a pressure of about 3549 kPa to about 12410 kPa (500 psig to about 1800 psig), a liquid hourly space velocity of about 0.5 V/V/Hr to about 1.5 V/V/Hr, and a hydrogen-containing gas treat rate of about 400 SCF/B to about 8000 SCF/B.

15. A method for producing low oxygen biomass-derived pyrolysis oil comprising the steps of:
   reacting esterified treated biomass-derived pyrolysis oil at first hydroprocessing conditions in the presence of hydrogen-containing gas and a first catalyst to produce a partially deoxygenated biomass-derived pyrolysis oil and water;
   separating the water from the partially deoxygenated biomass-derived pyrolysis oil;
   reacting the partially deoxygenated biomass-derived pyrolysis oil at second hydroprocessing conditions in the presence of additional hydrogen-containing gas and a second catalyst to convert residual oxygenated hydrocarbons therein into hydrocarbons to produce a fully deoxygenated biomass-derived pyrolysis oil; and
   recycling a portion of the low oxygen biomass-derived pyrolysis oil.

16. The method of claim 15, wherein the step of recycling comprises recycling a portion of the low oxygen biomass-derived pyrolysis oil comprising partially deoxygenated biomass-derived pyrolysis oil, fully deoxygenated biomass-derived pyrolysis oil, or both, in a ratio of about 1.5:1 to about 5:1 of the low oxygen biomass-derived pyrolysis oil to esterified treated biomass-derived pyrolysis oil.

* * * * *